United States Patent
Rautschek et al.

(10) Patent No.: US 6,187,891 B1
(45) Date of Patent: Feb. 13, 2001

(54) LINEAR POLYETHER-POLYSILOXANE COPOLYMERS, THEIR PREPARATION AND USE

(75) Inventors: Holger Rautschek, Nünchritz; Hartmut Spitzner, Dresden, both of (DE)

(73) Assignee: Wacker-Chemie GmbH, Munich (DE)

(*) Notice: Under 35 U.S.C. 154(b), the term of this patent shall be extended for 0 days.

(21) Appl. No.: 09/371,819

(22) Filed: Aug. 11, 1999

(30) Foreign Application Priority Data

Aug. 11, 1998 (DE) ............................... 198 36 260

(51) Int. Cl.$^7$ ................................... C08G 77/46
(52) U.S. Cl. ................. 528/25; 528/31; 528/15; 528/29; 556/444; 556/445; 568/673; 568/675
(58) Field of Search ................. 528/31, 15, 29, 528/25; 556/444, 445; 568/673, 675

(56) References Cited

U.S. PATENT DOCUMENTS

| | | |
|---|---|---|
| 3,947,386 | 3/1976 | Prokai et al. . |
| 4,150,048 | 4/1979 | Schilling et al. . |
| 4,384,976 | 5/1983 | Grunert et al. . |
| 5,032,662 | 7/1991 | Berger et al. . |
| 5,625,023 | 4/1997 | Chung et al. . |
| 5,629,133 | 5/1997 | Wolf et al. . |
| 5,733,971 | 3/1998 | Feldmann-Krane . |
| 5,869,727 | * 2/1999 | Crane et al. . |

FOREIGN PATENT DOCUMENTS

| | | |
|---|---|---|
| 2 210 934 | 9/1972 | (DE) . |
| 30 11 304 A1 | 10/1981 | (DE) . |
| 31 23 103 A1 | 12/1982 | (DE) . |
| 38 07 247 C1 | 5/1989 | (DE) . |
| 0 492 657 A1 | 7/1992 | (EP) . |
| 0 643 329 A2 | 8/1994 | (EP) . |
| 0 785 240 A2 | 7/1997 | (EP) . |

OTHER PUBLICATIONS

English Abstract corr. to DE 3123103.
The Synthesis Route of the Hydrosilylation is Known, W. Noll, Chemie und Technologie der Silicone.
I. Ojima, The Hydrosilylation Reaction, The Chemistry of Organic Silicon Compounds, (1989), Ch. 25, pp. 1479–1526.

* cited by examiner

Primary Examiner—Robert Dawson
Assistant Examiner—Kuo-Liang Peng
(74) Attorney, Agent, or Firm—Brooks & Kushman P.C.

(57) ABSTRACT

The present invention relates to linear polyether-polysiloxane copolymers of the general formula $A(BC)_nBA$, in which linear polyether and linear polysiloxane units are linked via Si—C bonds, and to a process for their preparation.

14 Claims, No Drawings

LINEAR POLYETHER-POLYSILOXANE COPOLYMERS, THEIR PREPARATION AND USE

TECHNICAL FIELD

The present invention relates to linear polyether-polysiloxane copolymers in which linear polyether units and linear polysiloxane units are linked via Si—C bonds. The copolymers according to the invention can be used widely and can, for example, be used as additives for coatings or as emulsion stabilizers.

BACKGROUND ART

A large number of classes of compounds of polyether-polysiloxane copolymers are known. The suitability of each individual type of copolymer for a specific application depends considerably on the structure of the polysiloxane and polyether units, their ratio, and their arrangement relative to one another, and the type of linkage between these units. In this connection, the linking of the units can be distinguished, inter alia, by Si—O—C bonding or by Si—C bonding.

As is known, polysiloxane-polyether copolymers linked by Si—O—C bonds are prepared by reaction of OH—terminated polyethers with siloxanes containing halogen, hydroxyl, alkoxy or acetoxy groups, for example (cf. W. Noll, "Chemie und Technologie der Silicone", Verlag Chemie, 1968, p. 321). These polyether-polysiloxane copolymers are known and available commercially.

Si—C-linked polysiloxane-polyether copolymers can, for example, be obtained by reaction of alkenyl-containing polyethers with polysiloxanes which contain Si—H groups with the help of a substance which accelerates the reaction of alkenyl compounds with Si—H bonds, e.g. Pt catalysts. For example, U.S. Pat. No. 5,625,023 describes compounds which are intended to prevent the formation of aerosols in silicone-based coatings which are to be applied quickly. These compounds are obtained by reacting an organohydrogensilicon compound with an oxyalkylene compound, a catalyst and a monohydric olefinic alcohol. The reaction can in this connection be carried out, inter alia, by hydrosilylation or by the addition reaction of the side and/or terminal SiH groups with the polyethers terminated at both ends with alkenyl groups, forming Si—C bonds between polyether and siloxane. The use of silicon compounds having Si—H side groups leads to branched copolymers. Using the process described it is not possible to prepare exclusively linear polyether-polysiloxane copolymers of defined molecular size.

EP 643 329 claims a large number of polyoxyalkylene-polysiloxane block copolymers for liquid radiation-curable compositions. In the general formula (II), Si—C bonds are present between polyether and polysiloxane units, one polysiloxane unit being a block in the middle of the molecule flanked by polyether groups, rather than two or more blocks or units being randomly distributed throughout the molecule.

DE 30 11 304 and DE 31 23 103 describe antifoam formulations for use in aqueous dispersions and solutions of synthetic resins which are free from mineral oxides, such as $SiO_2$ and $Al_2O_3$, and contain polysiloxane-polyether block polymers. These polymers, containing alternating polysiloxane and polyether units, are linked both via Si—C bonds and via Si—O—C bonds. In addition, DE 38 07 247 describes the use of polyoxyalkylene-polysiloxane block copolymers for the defoaming of aqueous dispersions, polysiloxane and polyoxyalkylene being linked exclusively via Si—O—C bonds.

Polysiloxane-polyether block copolymers in which polyether and polysiloxane units are linked via Si—O—C bonds have the disadvantage that these linkage sites can be cleaved in the presence of compounds containing free hydrogen atoms, such as, for example, alcohols, polyols or water (cf. W. Noll, "Chemie und Technologie der Silicone" [Chemistry and Technology of Silicones], Verlag Chemie, 1968, p. 323), the cleavage being accelerated considerably in particular by the presence of acidic or basic compounds. For example, in aqueous systems this leads to the hydrolysis, and in alcoholic systems to the alcoholysis of the polysiloxane-polyether block copolymers. This effect occurs in particular during storage of formulations which comprise such polysiloxane-polyether block copolymers and compounds containing free hydrogen atoms, and thus leads to an undesired negative change in the properties.

SUMMARY OF THE INVENTION

The object of the present invention was to provide linear polyether-polysiloxane copolymers in which linear polyether and linear polysiloxane units are linked via Si—C bonds, and processes for their preparation. The polymers according to the invention are be stable in the presence of compounds containing free hydrogen atoms and are suitable for use as foam stabilizers, antifoams and/or in formulations which act as antifoams, as additives for solvent-based coatings, low-solvent coatings, and solvent-free aqueous coatings, construction chemicals, pastes and other preparations, and/or as emulsion stabilizers.

DESCRIPTION OF THE PREFERRED EMBODIMENTS

The invention provides linear polyether-polysiloxane copolymers in which linear polyether and linear polysiloxane units are linked via Si—C bonds and which conform to the general formula $$A(BC)_nBA \tag{I}$$

in which n is $\geq 1$, preferably from 1 to 20, and

A is a group of the general formula

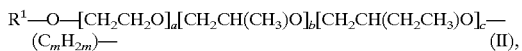

where $R^1$ independently of one another is either hydrogen, alkyl, aralkyl, aryl or an $R^2$—C(O)— radical, and $R^2$ is a substituted or unsubstituted alkyl radical having from 1 to 8 carbon atoms, m is an integer between 3 and 8, and a, b and c independently of one another are integers between 0 and 200, with the proviso that the sum (a+b+c) is from 2 to 300, B is a group of the general formula

where $R^3$ independently of one another are substituted and/or unsubstituted, saturated and/or unsaturated hydrocarbon radicals having from 1 to 20 carbon atoms, and d is an integer between 1 and 400, and C is a group of the general formula

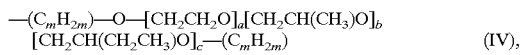
(IV), where m, a, b and c have the values given above.

In the polyether-polysiloxane copolymer according to the invention, the polyether moieties are bonded to the diorganopolysiloxane units via $-(C_mH_{2m})-$ groups, which can be linear or branched and consists of from 3 to 8, preferably from 3 to 6, carbon atoms.

In the general formula (I), the group A is a polyether unit of the general formula (II) which is notable for the fact that it is constructed from at least two polyoxyalkylene units and usually no more than 200 polyoxyalkylene units where, preferably, in the general formula (II) m assumes values between 3 and 6, a and b assume values between 0 and 40, and c assumes values between 0 and 30, with the proviso that the sum (a+b+c) is from 2 to 60. The polyoxyalkylene units may be derived from the polymerization of ethylene oxide and/or propylene oxide and/or butylene oxide. The ethylene oxide, propylene oxide and butylene oxide units may be distributed randomly, or may be in the form of block copolymers. The polyether unit of the general formula (II) may be constructed from just one alkylene oxide or a copolymer of two of the alkylene oxides mentioned. Terpolyethers containing all three repeating oxyalkyl moieties are also possible.

The polyether or polyoxyalkylene unit A is terminated by the group $R^1$. The nature of this group is unimportant for the purposes according to the invention. For example, the polyether unit can be terminated by a hydroxyl group ($R^1$ is a hydrogen atom), by an ether group ($R^1$ is a monovalent, straight-chain, or branched alkyl radical, aralkyl radical or else aryl radical, such as, for example, methyl, ethyl, n-propyl, i-propyl, butyl, hexyl, decyl, dodecyl, 2-phenylethyl, phenyl) or a carboxyl group in the form of an ester (such as, for example, acetyl), or else by a carbonic acid group or by an isocyanate group.

Group B in the general formula (I) is a linear diorganopolysiloxane unit of the general formula (III) which consists of at least two diorganosiloxy units and at most 400 diorganosiloxy units, preferably from 4 to 80 diorganosiloxy units, more preferably from 6 to 30 diorganosiloxy units, the diorganopolysiloxane units being bonded to the polyether units of the general formulae (II) or (IV) via Si—C bonds. The substituent $R^3$ in the diorganopolysiloxane units can be any desired branched and/or linear, substituted and/or unsubstituted, saturated and/or unsaturated hydrocarbon radical having from 1 to 20 carbon atoms. Preferred radicals $R^3$ are alkyl radicals having from 1 to 6 carbon atoms, such as methyl, ethyl, n-propyl, i-propyl, butyl or hexyl, or longer-chain radicals, such as octyl, decyl, dodecyl, octadecyl, particular preference being given to methyl groups. In addition, the alkyl groups can be modified by halogens or other substituents, such as, for example, 3,3,3-trifluoropropyl, chloromethyl, a saturated or unsaturated ring system constructed from carbon and hydrogen, such as, for example, cyclopentyl, cyclohexyl, cyclooctenyl, an aryl group, such as, for example, phenyl, 4-chlorophenyl, 4-methylphenyl, and the like.

The group C given in the general formula (I) corresponds to the general formula (IV) and is any desired linear polyether unit which is bonded at the chain beginning and at the chain end to a diorganopolysiloxane unit via an Si—C bond. The bonding to the diorganopolysiloxane units is analogous to the bonding of diorganosiloxane groups to group A via alkylene groups having from 3 to 8 carbon atoms. The polyether unit of the general formula (IV) contains at least two polyoxyalkylene units and generally no more than 300 polyoxyalkylene units. Preferably, in the general formula (IV), m assumes values between 3 and 6, a and b assume values between 0 and 120, and c assumes values between 0 and 30, with the proviso that the sum (a+b+c) is from 2 to 120. The polyoxyalkylene units may originate from the polymerization of ethylene oxide and/or propylene oxide and/or butylene oxide. The ethylene oxide, propylene oxide and butylene oxide units may be distributed randomly, or be in the form of block copolymers. The polyether unit C may be prepared from just one alkylene oxide, e.g. only ethylene oxide or only propylene oxide, or may be a copolymer of two of the alkylene oxides mentioned, e.g. ethylene oxide and propylene oxide. Terpolyethers are also possible.

The value n in formula (I) should be, on average, greater than/equal to 1, but is otherwise unimportant. The number n should thus be chosen depending on the subsequent intended use.

The invention further provides a process for the preparation of the polyether-polysiloxane copolymers of general formula (I) by reaction of (a) polyethers having an $R^1$ terminus and an alkenyl end-group of the general formula

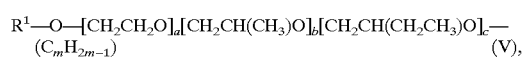
(V), (b) diorganopolysiloxanes having SiH end-groups of the general formula

(VI), and (c) polyethers having alkenyl end-groups of the general formula

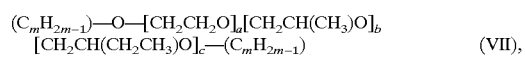
(VII), where $R^1$, $R^3$, a, b, c, d and m are as defined above, in the presence of a compound (d) which catalyzes hydrosilylation reactions, at temperatures of from 20 to 300° C.

The alkenyl polyethers (a) and (c) required for the formation of groups A and C in the general formula (I) can be synthesized, for example, by base-catalyzed polymerization of ethylene oxide, propylene oxide and/or butylene oxide onto an allyl alcohol initiator, and subsequent termination using alkenyl chloride or alkyl chloride or water (group C), and neutralization of the catalyst. Alkenyl polyethers of this type are known and available commercially.

The linear, Si—H-terminated diorganopolysiloxanes (b) of the general formula (VI) necessary for the formation of group B in formula (I) can be prepared, for example, by equilibration of 1,3-dihydrotetramethyldisiloxane with cyclic siloxanes in the presence of catalysts which speed up siloxane equilibration, and subsequent devolatilization. Such linear, α,ω-SiH-functional diorganopolysiloxanes are likewise known to the person skilled in the art and are commercially available.

The linear polyether-polysiloxane copolymers according to the invention are prepared by reaction of the stated compounds (a), (b) and (c) in the presence of a catalyst (d), preferably at elevated temperatures. The reaction takes place by hydrosilylation or addition of the Si—H bond to the double bond of the terminal ($C_mH_{2m-1}$) group, the size of the molecules being governed by the mixing ratio of the compounds of the general formulae (VI) and (VII) relative to the compound of the general formula (V). The polyether of the general formula (V) in this case acts as a chain stopper.

The synthesis route of the hydrosilylation is known (cf. W. Noll, "Chemie und Technologie der Silicone", Verlag Chemie, 1968, p. 48 and 321; Ojima, I. "The Hydrosilylation Reaction" in "The Chemistry of Organic Silicon Compounds", J. Wiley & Sons Ltd., 1989). Preferred catalysts are compounds or complexes of the metals of subgroup 8 of the Periodic Table of the Elements, in particular of platinum and of rhodium, e.g. the platinum compound known as "Speier catalyst" (hexachloroplatinic acid dissolved in isopropanol), with or without the addition of solvents; the so-called "Lamoreaux catalyst" (hexachloroplatinic acid in ethanol) or the group of "Karstedt catalysts" (vinylsiloxane/platinum complexes), but also "Wilkinson's catalyst" (vinylsiloxane/platinum/chloro-triphenylphosphine complex). It is possible to fix the hydrosilylation catalyst to a carrier, e.g. in colloidal form on activated carbon. In addition, in order to control the reaction rate, known inhibitors, such as alkynols, can be used. The hydrosilylation catalysts are preferably used in concentrations from 0.1 to 100 ppm, more preferably from 2 to 50 ppm, and particularly preferably from 4 to 20 ppm, based on the total amount of starting materials.

For the reaction, the linear, α-$R^1$, ω-alkenyl-functional polyethers (a) are mixed with the linear α,ω-SiH-functional diorganopolysiloxanes (b), the linear, α,ω-alkenyl-functional polyethers (c) and the hydrosilylation catalyst (d). The order in which addition takes place is in most cases unimportant. If the compounds (a), (b) and (c) are immiscible with one another or if the mixing viscosity is too high, it is appropriate to use a solvent or a solubility promoter. For this, the alkenyl-containing polyethers (a) and (c) in a solution in an aprotic solvent, e.g. benzene, toluene, xylene or saturated hydrocarbons, are initially introduced and the SiH-functional diorganopolysiloxane (b), optionally likewise dissolved, and the hydrosilylation catalyst (d) are added thereto. The additives and solvents must not adversely affect the course of the reaction. In particular, aromatic solvents such as toluene are suitable for carrying out hydrosilylation reactions. A preferred embodiment is the reaction in the presence of a solvent, where, prior to the addition of the diorganopolysiloxane, the solution is heated to reflux and any water which is present is separated off azeotropically. After hydrosilylation has taken place, the solvent should be removed.

The weight ratio of (a) to (b) and (c) is dependent on the desired copolymer of the general formula (I). It is generally preferable to choose an equimolar ratio of silicon-bonded hydrogen atoms to alkenyl groups. In addition, it is preferable in the synthesis of the copolymers according to the invention to use the compounds (a) and (c) in excess. The ratio of (a) to (b) and (c) further allows the person skilled in the art to easily control the mean molecular weight of the copolymers according to the invention via the size of n in the general formula (I) and to set it according to the necessary requirements. The number n in formula (I) should be at least 1 in order to obtain copolymers according to the invention with the corresponding properties. It is preferable to set n in a controlled way since the viscosity and the mean molecular weight increase with increasing values for n and for the same size of units A, B and C in the general formula (I). In order to permit easy application of the copolymers according to the invention, copolymers of the general formula (I) with a value for n of from 1 to 20 are particularly preferred. It is a particular advantage of the preparation process according to the invention to be able to control the mean molecular weight of the copolymers according to the invention by simply setting a desired ratio of starting materials.

The temperatures during the preparation of the copolymers according to the invention are up to 200° C. Temperatures of from 50 to 120° C. are preferred. The reaction time is between 1 min and 20 h. The degree of conversion can be determined from the amount of hydrogen which can be eliminated under basic conditions from unreacted Si—H groups; the reaction is terminated when eliminated hydrogen is no longer detectable.

It is possible that during the preparation of the linear polyether-polysiloxane copolymers according to the invention small amounts of copolymers in which in the general formula (I) the group A is hydrogen, hydroxyl or an alkenyl radical, are formed as byproduct or in the case of incomplete reaction and are thus present in the copolymers according to the invention. These byproducts, which are produced especially during industrial synthesis, are not, however, a problem in later use.

The invention also provides for the use of the linear polyether-polysiloxane copolymers according to the invention as foam stabilizers, antifoams and/or in formulations which act as antifoams, as additives for solvent-containing, low-solvent and solvent-free, aqueous coatings, construction chemicals, pastes and other preparations, and/or as emulsion stabilizers.

The choice of starting materials and the ratio of the polysiloxane to the polyethers, and the molecular weight of the resulting copolymers determine the preferred application.

The copolymers according to the invention can be used as foam stabilizers for the preparation of polymer foams such as, for example, PUR foams. The foams are prepared by known methods, preferably from 0.01 to 8% by weight of the copolymer according to the invention being added to the customary mixture of polyol component, isocyanate, catalyst and blowing agent.

In addition, the copolymers according to the invention can be used as antifoams or in formulations which act as antifoams, and may act as emulsion stabilizers, as deaerating agents, and as antifoam oils. In this connection, the choice of starting materials and the polysiloxane-polyether ratio are decisive for the preferred use of the copolymers.

In the case of use as an antifoam oil, other known auxiliaries can be added, such as, for example, metal oxides, such as, for example, $SiO_2$ and $Al_2O_3$, metal soaps, such as, for example, aluminum stearate, highly dispersed silica and other substances effective as antifoam oils, such as, for example, mineral oils, paraffin oils, silicone oils, fatty acid esters and fatty alcohols in amounts of from 1 to 99%, based on the total weight of the formulation. Particular preference is given to the use of such antifoam formulations in dilute form, e.g. as O/W (oil in water) emulsions. Preparation of antifoam formulations can be carried out by dilution with suitable solvents, such as, for example, butyl diglycol, isopropanol, ethylene glycol, propylene glycol, xylene, toluene, higher-boiling aromatic and/or aliphatic petroleum distillation fractions, or butyl acetate, and by addition of known anionic, cationic or nonionic emulsifiers, other known additives and water. The ready-to-use solutions generally have a content of copolymers according to the invention of from 0.1 to 95% by weight, preferably from 1 to 45% by weight. Preference is given to dilutions or emulsions with a content of copolymers according to the invention of from 2 to 35% by weight.

The antifoam emulsions are prepared, for example, by simple stirring of the constituents and subsequent homogenization using rotor-stator homogenizers, colloid mills or high-pressure homogenizers.

Antifoam formulations which comprise the copolymers according to the invention are suitable, inter alia, for use in detergents and cleaners, for controlling foam in waste water plants, in the preparation of pulp and paperworking, in methods for dyeing textiles and in natural gas scrubbing. The copolymers according to the invention are added to the medium from which foam is to be removed in amounts of a few ppm up to 5% by weight.

The copolymers according to the invention are also used as additives in solvent-based, solvent-containing and solvent-free coatings, dispersions, construction chemicals and pastes. Through the correct choice of starting materials it is likewise possible in this connection to prepare additives in a targeted manner. The number of diorganosiloxy units d in the general formula (III) should for this use preferably be from 2 to 80, in water-based coating systems preferably from 3 to 50. For this intended use, the copolymers according to the invention can be used either in pure form or in diluted form as described above. The copolymers according to the invention are added here to the coating system in amounts of from a few ppm to 5% by weight, preferably from 0.01 to 4% by weight, particularly preferably from 0.05 to 2% by weight.

A further use of the copolymers according to the invention is the stabilization of emulsions. The copolymers according to the invention are used here in amounts of from 0.05 to 20% by weight, based on the total amount of the emulsion, preferably in amounts of from 0.5 to 10% by weight.

It can be shown that the linear polyether-polysiloxane copolymers according to the invention, which can be prepared by the claimed process without problems, are stable even in the presence of compounds containing free hydrogen atoms and can be used in excellent manner as foam stabilizers, antifoams and/or in formulations which act as antifoams, and as additives for solvent-containing, low-solvent and solvent-free aqueous coatings, construction chemicals, pastes and other preparations, and/or as emulsion stabilizers.

WORKING EXAMPLES

All parts and percentages given below are by weight. The viscosities were measured at 25° C. using a rotary viscometer, unless stated otherwise.

I. Preparation Examples

The linear polyether-polysiloxane copolymers according to the invention and prepared in the examples below conform to the general formula $A(BC)_nBA$ (I) and are obtained by reaction of (a) polyethers with an $R^1$ and an allyl end-group of the general formula

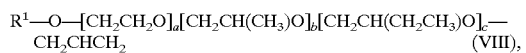

$R^1$—O—[$CH_2CH_2O$]$_a$[$CH_2CH(CH_3)O$]$_b$[$CH_2CH(CH_2CH_3)O$]$_c$—$CH_2CHCH_2$ (VIII), (b) diorganopolysiloxanes with SiH end-groups of the general formula

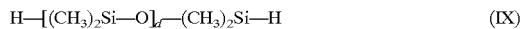

$H$—[$(CH_3)_2Si$—$O$]$_d$—$(CH_3)_2Si$—$H$ (IX)

and (c) polyethers with allyl end-groups of the general formula

$CH_2CHCH_2$—O—[$CH_2CH_2O$]$_a$[$CH_2CH(CH_3)O$]$_b$[$CH_2CH(CH_2CH_3)O$]$_c$$CH_2CHCH_2$ (X), in the presence of a platinum catalyst at elevated temperatures.

Preparation Examples H1 to H11

The amounts of polyether (a) and (c) (general formulae VIII and X) given in Table 1 were diluted with toluene to give a 50% strength solution and then heated to reflux, and any water present was separated off azeotropically. Then, the amounts of an α,ω-SiH-terminated dimethylpolysiloxane (b) of chain length d given in Table 1 and dissolved in 50 ml of toluene were added, and after the mixture had been cooled to 90° C., a 0.01 m solution of $H_2PtCl_6$ in isopropanol was added, the content of platinum, based on the weight of the feed substances, being 8 ppm. After this catalyst solution had been added, the mixture was refluxed for one hour and then the solvent was distilled off. The composition of the reaction products conformed to the general formula (I) [$A(BC)_nBA$], the value for n and the viscosity of the product being listed in Table 1. Hydrogen which can be eliminated using a base was no longer detectable in the end product.

Preparation Examples H12 and H13

The amounts of polyether (a) and (c) and α,ω-SiH-terminated dimethylpolysiloxane of chain length d given in Table 1 were initially introduced and mixed with a 0.01 m solution of $H_2PtCl_6$ in isopropanol, the content of platinum, based on the weight of the feed substances, being 8 ppm. The mixture was maintained at a temperature of 50° C. with stirring for 20 h. The composition of the reaction products conformed to the general formula (I) [$A(BC)_nBA$], the value for n and the viscosity of the product being given in Table 1. Hydrogen which can be eliminated under basic conditions was no longer detectable in the end product.

TABLE 1

| Example/ copolymer | Polyether (a) Amount in g | $R^1$ | a | b | c | Siloxane (b) Amount in g | d | Polyether (c) Amount in g | a | b | c | n | End product Viscosity in mPas |
|---|---|---|---|---|---|---|---|---|---|---|---|---|---|
| H1/CP1 | 33.7 | $C_4H_9$— | 25 | 25 | 0 | 7.7 | 10 | 25.6 | 0 | 70 | 0 | 1 | 1,480 |
| H2/CP2 | 33.7 | $C_4H_9$— | 25 | 25 | 0 | 20 | 25 | 46.25 | 0 | 120 | 0 | 1 | 4,770 |
| H3/CP3 | 62.2 | HO— | 25 | 25 | 0 | 30 | 10 | 154.2 | 0 | 120 | 0 | 1 | 4,580 |
| H4/CP4 | 23 | $C_4H_9$— | 25 | 25 | 0 | 15 | 10 | 64 | 0 | 70 | 0 | 3 | 2,120 |
| H5/CP5 | 9.2 | HO— | 9 | 0 | 0 | 104 | 7 | 109.5 | 12 | 0 | 0 | 17 | 15,700 |
| H6/CP6 | 10.3 | HO— | 0 | 16 | 0 | 15 | 10 | 64.1 | 0 | 70 | 0 | 3 | 3,250 |
| H7/CP7 | 30.3 | $C_4H_9$— | 16 | 12 | 0 | 56 | 10 | 123 | 19 | 19 | 0 | 6 | 26,300 |
| H8/CP8 | 20.6 | HO— | 0 | 16 | 0 | 53.2 | 51 | 77.1 | 0 | 120 | 0 | 1 | 6,700 |
| H9/CP9 | 4.9 | HO— | 0 | 16 | 0 | 85.1 | 230 | 17.7 | 0 | 120 | 0 | 1 | 45,400 |
| H10/CP10 | 5.7 | $C_4H_9$— | 0 | 0 | 10 | 10.8 | 10 | 41.8 | 0 | 70 | 0 | 3 | 3,970 |
| H11/CP11 | 20.0 | HO— | 0 | 16 | 0 | 77 | 51 | 33.7 | 0 | 25 | 25 | 1 | 2,900 |
| H12/CP12 | 20.6 | HO— | 0 | 16 | 0 | 53.2 | 51 | 77.1 | 0 | 120 | 0 | 1 | 6,100 |
| H13/CP13 | 33.7 | $C_4H_9$— | 25 | 25 | 0 | 7.7 | 10 | 25.6 | 0 | 70 | 0 | 1 | 1,370 |

II. Application Examples
Preparation of Formulation F1

38.0 g of copolymer CP2 were mixed with 2 g of a prehydrophobicized, commercially available silica, characterized by a BET surface area of 200 m²/g, and then dispersed for one hour using a dissolver disc.

Preparation of Formulation F2

114 g of copolymer CP3 were mixed with 6 g of a prehydrophobicized, commercially available silica, characterized by a BET surface area of 200 m²/g, and then dispersed for one hour using a dissolver disc.

Preparation of Formulation F3

2 parts of sorbitan stearate and 1 part of polyoxyethylenesorbitan stearate were dissolved in 40 parts of water with warming. 10 parts of formulation F2 were added with stirring. After the mixture had been stirred for 10 min, a further 46.8 parts of water and 0.2 part of a preservative were slowly mixed in. The mixture was homogenized by grinding in a colloid mill.

Preparation of Formulation F4

10 g of the copolymer CP3 were dissolved in 90 g of ethylene glycol monobutyl ester.

The copolymers CP1 to CP3 prepared in accordance with Preparation Examples H1 to H3, and formulations F1 to F4 were tested for their suitability in various applications.

Use as Foam Stabilizer for Polyurethane Foam

Copolymer CP1 was investigated for its effectiveness in terms of increase in height and cellular nature in a commercial 141b (HFC)-blown rigid foam system and as regards increase in height and air permeability in a commercial, $CO_2$-blown flexible foam system. For comparison with the copolymer CP1 according to the invention, a non-inventive copolymer V1 was used which was prepared as follows: 195 g of a dried allyl polyether of average formula $CH_2$=CH—$CH_2$—(O—$CH_2$— $CH_2$)$_{18}$—(O—$CH_2$—CH($CH_3$))$_{12}$—O—($CH_2$)$_3CH_3$ and 250 ml of toluene were initially introduced, heated to 90° C. and blanketed with $N_2$, and 58 g of the polyorganosiloxane $(CH_3)_3SiO[Si(CH_3)(H)O]_{7.2}[Si(CH_3)_2O]_{43}Si(CH_3)_3$ and 6 ppm of platinum in the form of a 0.01 molar solution of $H_2PtCl_6$ in isopropanol were added quickly. The exothermic reaction led to a temperature increase of 10° C., and the cloudy mixture clarified after 60 sec. To complete the reaction, the reaction was continued for 1 h at 105° C., and then the toluene was distilled off under reduced pressure. This gave a polyether-modified polysiloxane, which was a clear liquid, which only appeared pale yellow in a thick layer, with a viscosity of 760 mPas.

The results are given in Table 2.

TABLE 2

| | Copolymer CP1 according to the invention | Comparison copolymer V1 |
|---|---|---|
| Rigid foam system | | |
| Parts of copolymer per 100 parts of polyol | 1.5 | 1.5 |
| Foaming temperature (° C.) | 40 | 40 |
| Flow length of the foam block (cm) | 160 | 158 |
| Cellular nature | Fine-pored, uniform | Fine-pored, uniform |
| Flexible foam system | | |
| Bulk density of the system (kg/m³) | 30 | 30 |
| Parts of copolymer per 100 parts of polyol | 0.3 | 0.3 |
| Relative height, based on V1 (%) | 102 | 100 |
| Relative air permeability, based on V1 (%) | 101 | 100 |

The copolymer CP1 according to the invention exhibits considerable advantages over the comparison copolymer V1 in the rigid foam and flexible foam systems used.

Use as Antifoam in Acrylate Dispersions

To test the effectiveness of the copolymers according to the invention as antifoam constituents, the formulations F1 to F4 were used. For comparison, a commercially available antifoam V2 (8 to 10% strength solution of an SiOC-linked organopolysiloxane-polyoxyalkylene block copolymer in ethylene glycol monobutyl ether) was used.

Application Test 1

50 g of an acrylate dispersion (Neocryl XK90) and the amount of antifoam given in Table 3 were weighed into a flask and then shaken vigorously by hand for 1 min, and the foam height was measured. The antifoam-containing acrylate dispersion was then stored for 30 days, and then the foam height was determined again after the dispersion had been shaken for 1 min. Then, to test the coating for surface defects, a 60 μm-thick film was applied to a cleaned glass surface.

The results are summarized in Table 3.

TABLE 3

| Antifoam | Concentration | Foam height without storage, in mm | Foam height after storage for 30 days, in mm | Surface defects |
|---|---|---|---|---|
| None | 0 | 18 | 18 | Air bubbles |
| F1 | 0.2% | 1 | 1 | None |
| F2 | 0.2% | 1 | 1 | None |
| F3 | 0.2% | 1 | 0 | None |
| F4 | 0.2% | 1 | 1 | None |
| V2 | 0.2% | 2 | 4 | Orange peel effect |

Application Test 2

The acrylate dispersions were prepared as in Application Test 1 with the difference that the dispersions were diluted in each case with 75 g of deionized water with slow stirring and then stirred at 5000 rpm for 3 minutes in a measuring cylinder using a high-speed stirrer (Dispermat) and a small dissolver disc arranged at about 1 cm above the floor of the cylinder. The parameter measured was the foam height 15 s after the dissolver had come to a standstill. The acrylate dispersion was stored for 30 days, and the foam height was measured again after the dispersion had been stirred for 3 minutes at 5000 rpm.

The test for surface defects was carried out as in Application Test 1, using a 60 µm-thick film on a cleaned glass surface.

The results are summarized in Table 4.

TABLE 4

| Antifoam | Foam height without storage, in mm | Foam height after storage for 30 days, in mm | Surface defects |
|---|---|---|---|
| None | 170 | 169 | Air bubbles |
| F1 | 5 | 4 | None |
| F2 | 8 | 4 | None |
| F3 | 1 | 1 | None |
| F4 | 5 | 3 | None |
| V2 | 48 | 65 | Small craters |

The copolymers according to the invention and formulations prepared therefrom exhibit excellent properties when used as antifoams and have significant advantages over the comparison formulations.

Use as Flow-control Agents in Acrylate Coatings

In Application Test 1 (use as antifoams in acrylate dispersions), the acrylate dispersion comprising the comparison antifoam V2 exhibited a significant orange-peel effect in the test for surface defects.

Application Test 1 was now repeated with the difference that 0.1% of the copolymer CP1 according to the invention, based on the total amount of acrylate dispersion, was additionally added to the comparison antifoam V2. The foam heights determined were analogous to Application Test 1, without storage 2 mm and after storage for 30 days 4 mm, but no orange-peel effect was observed in the test for surface defects.

The copolymers according to the invention are suitable, as additives, for favorably influencing the surface properties of surface coating formulations and coatings.

Use as Antifoams in Surfactant Solutions 40 g of a 10% strength solution of polyvinyl alcohol (degree of saponification 88%) and 160 g of deionized water were mixed in a beaker the resulting solution having a viscosity of 26 mPas. The mixture was foamed up for 90 s using two countercurrent stirrers (600 rpm). 10 mg of the formulation F2, comprising the copolymer CP3 according to the invention and in the form of a 10% strength solution in methyl ethyl ketone were added to the solution. The mixture was stirred for 90 s, and the initial height $H_0$ was measured, followed by the foam heights at intervals of one minute until the end of measurement after 10 min ($H_1$, $H_2$, $H_3$, . . . ) or until the appearance of a free liquid surface.

The percentage defoaming (%E) is calculated from:

$\%E = (1-I/BW) \times 100$ $I_1 = (H_0 + H_1 + H_2 + \ldots + H_{10}) \times 2$ $I_2 = I_1 - H_0 - H_{10}$ $I = I_2/2H_0$ BW=I without added antifoam The percentage defoaming achieved using formulation F2 was 99%.

For comparison, defoaming was carried out using a commercially available antifoam based on polydimethylsiloxane into which, analogously to formulation F2, prehydrophobicized silica with a BET surface area of 200 $m^2/g$ had been dispersed. Using this antifoam formulation, a percentage defoaming of only 61% was achieved.

The copolymers according to the invention are highly suitable for use for defoaming high-foaming aqueous surfactant solutions.

Use as Antifoams for a Wash Liquor for Textile Pretreatment

A solid detergent having an antifoam content of 0.3% was used to prepare a liquid concentrate by dissolving 120 g of the detergent in 1200 ml of water at 40° C. with slow stirring. This liquid concentrate was stored for one week at 2° C. in an upright cylinder with a discharge cock at the lower end; during storage as little as possible, of the antifoam, should separate out from the wash liquor, and thereafter the solution should effectively defoam upon use.

For the test, the lower 400 ml of the prepared wash liquor were removed and stirred in a beaker on a hot plate for 30 min at 600 $min^{-1}$ using a cage stirrer. The temperature increased from 25° C. to 60° C. The height of the foam formed was measured at intervals of 10 seconds and the measured values were used to calculate the foam height integral H over the total time as a dimensionless numeral. The foam height integral H gives the amount of foam formed during the test.

The tests were carried out on the formulation F2 comprising the copolymer CP3 according to the invention, and, as comparison, an antifoam (V3) based on polydimethylsiloxane into which 5% of hydrophobicized precipitated silica having a BET surface area of 200 $m^2/g$ had been dispersed.

The experimental data are given in Table 5.

TABLE 5

| Antifoam | Appearance of the wash liquor after 7 days at 2° C. | Foam height integral H |
|---|---|---|
| None | Slightly cloudy solution | 30.83 |
| F2 | Slightly cloudy solution | 13.02 |

TABLE 5-continued

| Antifoam | Appearance of the wash liquor after 7 days at 2° C. | Foam height integral H |
|---|---|---|
| V3 | Antifoam separates as silicone film on the surface | 28.97 |

The copolymers according to the invention are highly suitable as antifoams for textile applications.

What is claimed is:

1. A linear polyether-polysiloxane copolymer in which linear polyether and linear polysiloxane units are linked via Si—C bonds, and which conforms to the general formula $$A(BC)_nBA \quad (I),$$

in which n is $\geq 1$, and

A is a group of the general formula $$R^1-O-[CH_2CH_2O]_a[CH_2CH(CH_3)O]_b[CH_2CH(CH_2CH_3)O]_c-(C_mH_{2m})- \quad (II),$$

where $R^1$ independently of one another is either hydrogen, alkyl, aralkyl, aryl or an $R^2-C(O)-$ radical, and $R^2$ is a substituted or unsubstituted alkyl radical having from 1 to 8 carbon atoms, m is an integer between 3 and 8, and a, b and c independently of one another are integers between 0 and 200, with the proviso that the sum (a+b+c) is from 2 to 300, B is a group of the general formula $$-(R^3{}_2Si-O)_d-R^3{}_2Si- \quad (III),$$

where $R^3$ independently of one another are substituted and/or unsubstituted, saturated and/or unsaturated hydrocarbon radicals having from 1 to 20 carbon atoms, and d is an integer between 1 and 400, and C is a group of the general formula $$-(C_mH_{2m})-O-[CH_2CH_2O]_a[CH_2CH(CH_3)O]_b[CH_2CH(CH_2CH_3)O]_c-(C_mH_{2m})- \quad (IV),$$

where m, a, b and c have the values given above.

2. The polyether-polysiloxane copolymer as claimed in claim 1, wherein in the general formula (I) n assumes values between 1 and 20.

3. A polyether-polysiloxane copolymer as claimed in claim 1, wherein in the general formula (II) m assumes values between 3 and 6, a and b assume values between 0 and 40, and c assumes values between 0 and 30, with the proviso that the sum (a+b+c) is from 2 to 60.

4. A polyether-polysiloxane copolymer as claimed in claim 1, wherein in the general formula (II) the radical $R^1$ is hydrogen, an alkyl radical having from 1 to 4 carbon atoms and/or an acetyl radical.

5. A polyether-polysiloxane copolymer as claimed in claim 1, wherein in the general formula (III) the radicals $R^3$ are monovalent, saturated, substituted or unsubstituted hydrocarbon radicals having from 1 to 6 carbon atoms.

6. A polyether-polysiloxane copolymer as claimed in claim 1, wherein in the general formula (III) the radicals $R^3$ are saturated or unsaturated, substituted or unsubstituted cyclic hydrocarbon radicals and/or aryl radicals.

7. A polyether-polysiloxane copolymer as claimed in claim 1, wherein in the general formula (IV) m assumes values between 3 and 6, a and b assume values between 0 and 120, and c assumes values between 0 and 30, with the proviso that the sum (a+b+c) is from 2 to 120.

8. A process for the preparation of the polyether-polysiloxane copolymers as claimed in claim 1, said process comprising reacting (a) polyethers having an $R^1$ and an alkenyl end-group of the general formula $$R^1-O-[CH_2CH_2O]_a[CH_2CH(CH_3)O]_b[CH_2CH(CH_2CH_3)O]_c-(C_mH_{2m-1}) \quad (V),$$

(b) diorganopolysiloxanes having SiH end-groups of the general formula $$H-(R^3{}_2Si-O)_d-R^3{}_2Si-H \quad (VI)$$

and (c) polyethers having alkenyl end-groups of the general formula $$(C_mH_{2m-1})-O-[CH_2CH_2O]_a[CH_2CH(CH_3)O]_b[CH_2CH(CH_2CH_3)O]_c-(C_mH_{2m-1}) \quad (VII),$$

where $R^1$, $R^3$, a, b, c, d and m are as defined above, in the presence of a compound (d) which catalyzes hydrosilylation reactions, at temperatures of from 20° C. to 300° C.

9. The process of claim 8, wherein complexes or compounds of metals from subgroup 8 of the Periodic Table of the Elements are used as the compound (d) which catalyzes hydrosilylation reactions.

10. The process of claim 8, wherein the reaction is carried out in the presence of one or more aprotic solvents.

11. A foam stabilizer, comprising one or more polyether-polysiloxane copolymers as claimed in claim 1.

12. An antifoam or antifoam formulation, comprising one or more polyether-polysiloxane copolymers as claimed in claim 1.

13. An aqueous composition comprising, in addition to water, one or more polyether-polysiloxane copolymers as claimed in claim 1.

14. An aqueous emulsion comprising, in addition to water, one or more polyether-polysiloxane copolymers as claimed in claim 1.

* * * * *